March 8, 1949. W. W. CARSON, JR 2,463,600
TEMPERATURE REGULATOR FOR CONTROLLING
EITHER A HEATING OR COOLING MEDIUM
Filed Sept. 15, 1947 4 Sheets-Sheet 1

Fig. 1.

INVENTOR
William W. Carson, Jr.
BY
Cameron, Kerkam & Sutton
ATTORNEYS

INVENTOR
William W. Carson, Jr.
BY
Cameron, Kerkam & Sutton
ATTORNEYS

Patented Mar. 8, 1949

2,463,600

UNITED STATES PATENT OFFICE 2,463,600

TEMPERATURE REGULATOR FOR CONTROLLING EITHER A HEATING OR COOLING MEDIUM

William W. Carson, Jr., Knoxville, Tenn., assignor to Robertshaw-Fulton Controls Company, Knoxville, Tenn., a corporation of Delaware Application September 15, 1947, Serial No. 774,014

12 Claims. (Cl. 236—1)

This invention relates to temperature regulators, and more particularly to a temperature regulator adapted to control automatically the flow of either a heating or a cooling medium for use with systems wherein the same heat interchange device or devices are used whether a heating medium is circulated into heat interchanging relationship therewith in cold weather or a cooling medium is circulated into heat interchanging relationship therewith in warm weather.

If a thermostatically operated valve is to control the flow of either a heating medium or a cooling medium to maintain a desired temperature condition or range, the operation in response to the thermostat must be reversed depending upon whether a heating medium or a cooling medium is being controlled, i. e., if the valve is operating to control a heating medium, an increase in temperature above the temperature to be maintained requires that the valve be moved toward closed position to decrease the quantity of heating medium being admitted to the heat interchanger, whereas if the valve is controlling a cooling medium, an increase in temperature above that which is to be maintained requires a movement of the valve toward open position to increase the amount of cooling medium flowing to the heat interchanger.

It is an object of this invention to provide an improved temperature regulator of the type above characterized wherein a single valve unit under thermostatic control serves to control the flow of either a heating medium or a cooling medium.

Another object of this invention is to provide an improved temperature regulator of the type characterized wherein a valve unit comprising two valve members on a common stem are appropriately conditioned by a thermostat subjected to the temperature of the medium to be controlled so as to position them properly with respect to associated valve seats for controlling the flow of either a heating medium or a cooling medium as determined by said thermostat.

Another object of this invention is to provide a device of the type last characterized which includes means to prevent the valve members from being so actuated by the thermostatic control that the temporarily inactive valve member interferes with the proper flow of the medium under control.

Another object of this invention is to provide an improved temperature regulator of the type characterized which is accurately and sensitively responsive to variations in the temperature to be maintained.

Another object of this invention is to provide an improved temperature regulator of the type characterized which is accurately balanced against variations in the pressure of the medium to be controlled.

Another object of this invention is to provide an improved temperature regulator of the type characterized which may be readily and accurately adjusted to predetermine the temperature to be maintained.

Another object of this invention is to provide an improved temperature regulator of the type characterized which includes means for manually positioning the valve unit if for any reason local conditions interfere with the starting of the desired control cycle.

Another object of this invention is to provide an improved temperature regulator of the type characterized wherein there is a continuous flow of the medium to be controlled with respect to the thermostat controlling the valve unit so as to assure prompt response to a change in such medium.

Another object of this invention is to provide an improved temperature regulator of the type characterized which is compact in structure and composed of a relatively few number of parts that are simple in construction and economical to fabricate and assemble.

Other objects of the invention will appear as the description of the invention proceeds.

The invention is capable of receiving a variety of mechanical expressions only one of which has been illustrated on the accompanying drawings, and it is therefore to be expressly understood that the drawings are for purposes of illustration only, and are not to be construed as a definition of the limits of the invention, reference being had to the appended claims for that purpose.

Referring in detail to the accompanying drawings, wherein the same reference characters are used in the several figures to denote corresponding parts.

Figure 1:
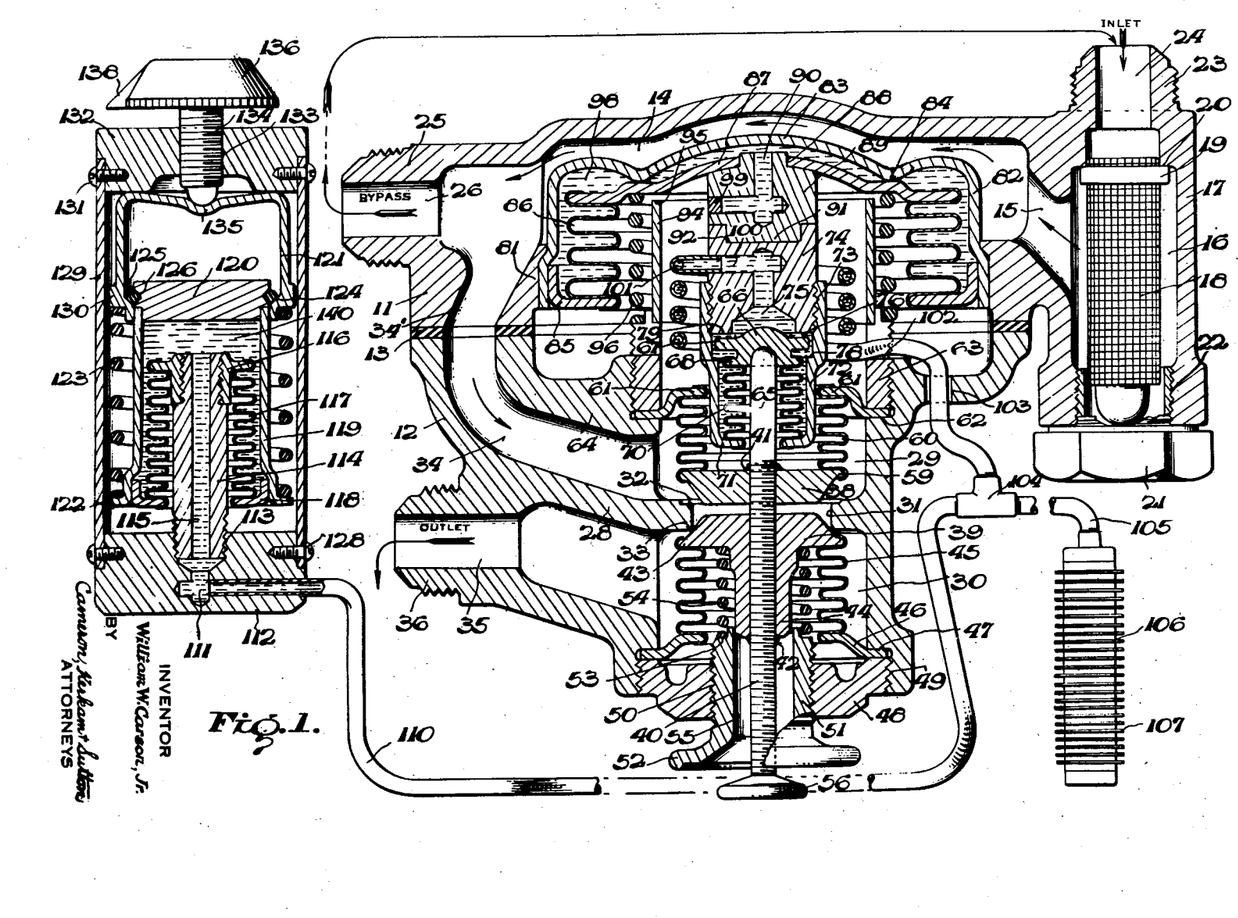
Fig. 1 is a somewhat diagrammatic view illustrating in axial section an embodiment of the present invention conditioned for controlling the flow of a cooling medium.

As here illustrated, the regulator embodying the present invention includes a housing of any suitable size, construction and material, and shown as composed of two sections 12 and 11 joined together in any suitable way, as by flanges and bolts, preferably with an interposed gasket 13. Housing section 11 contains a chamber 14 which has an inlet opening 15, here shown as leading from the chamber 16 of a casing extension 17 containing a filter 18 of any suitable character and construction. Filter 18 is shown as provided with a flange 19 held against a shoulder 20 in the chamber 16 by means of a retaining cap or nut 21 threadedly received in an aperture 22 provided in the wall of the housing extension 17. Housing extension 17 also has a threaded nipple 23 for attachment in any suitable way to piping leading to appropriate sources of heating medium and cooling medium, the medium to be controlled entering the housing extension 17 through inlet 24, and after passing through the filter 18, flowing into the chamber 14 through opening 15.

Housing section 11 also has a threaded nipple 25 through which extends a by-pass opening 26 communicating with the chamber 14 at one end and with any suitable by-pass passage attached in any suitable way to the nipple 25 and connected at its opposite end to any suitable portion of the piping leading to the inlet 24, so that a continuous circulation of the medium under control may be maintained through chamber 14 and said by-pass back to the piping conveying said medium to the inlet 24 to the end that by stagnation or local temperature conditions the thermostat in said chamber 14 as hereinafter described may not become unresponsive to a change in the medium to be controlled.

Housing section 12 is shown as provided interiorly with a partition 28 between two interior chambers 29 and 30 which are in communication through a valve port 31 that has a pair of valve seats 32 and 33 at its opposite extremities. Chamber 29 is in communication with the chamber 14 through passages 34 and 34' in the housing sections 12 and 11 respectively, while chamber 30 is in communication with an outlet opening 35 extending through a threaded nipple 36 to which may be connected in any suitable way the piping leading to the heat exchange device or devices in which the heating or cooling medium is to be used.

For cooperation with said valve seats 32 and 33 a valve unit is provided, comprising a pair of valve members 38 and 39 mounted on a common stem 40, the latter being here shown as threaded so as to provide for an initial adjustment of the spacing of said valve members to function as hereinafter explained, after which said valve members are permanently secured to said stem 40, as by solder at points 41 and 42. Valve member 39 is provided with a peripheral flange 43, and with an elongated hub 44 for a purpose to be explained. Hermetically sealed to said flange 43 is an expansible and collapsible corrugated tubular wall or bellows 45 the opposite end of which is hermetically sealed to a ring 46 held in position against a shoulder 47 by an exteriorly threaded annular cap 48 received in an opening 49 in the outer wall of housing section 12. The inner opening 50 of said cap 48 is also threaded, and received therein is an exteriorly threaded annular nut 51 which extends to the exterior of the cap 48 and is there provided with manual operating means or knob 52 whereby the position of said nut may be adjusted. The inner end of annular nut 51 is suitably formed at 53 to provide a spring seat, and interposed between said seat and the flange 43 on the valve member 39 is a coil spring 54. The external diameter of the before mentioned hub 44 and the internal diameter of the passage 55 through the annular nut 51 are so related that they cooperate to provide a guide for the valve unit comprising valve members 38 and 39 and stem 40. The valve stem 40 also extends through the passage 55 in the annular nut 51 to the exterior of said nut as shown, where it is provided with a manually operating means or knob 56 for a purpose to be explained.

Valve member 38 is also provided with a peripheral flange 59 to which is hermetically sealed one end of an expansible and collapsible corrugated tubular wall or bellows 60 the opposite end of which is hermetically sealed to a ring 61 held in position against a shoulder 62 by an exteriorly threaded retaining ring 63 received in an opening provided in the wall 64 of housing section 12. Valve members 38 and 39 are of equal effective areas, as are also the bellows 45 and 60, and port 31 has a diameter approximately midway between the inside and outside diameters of said bellows, so that the two valve members and their flexible mounting means are at all times balanced as respects the pressure of the medium to which they are subjected.

Stem 40 extends beyond valve member 38 as shown at 65, and its extremity bears against or it may be suitably attached to, a movable member in the form of a head or plunger 66 provided with a main flange 67 and a flange 68 of smaller diameter. Hermetically sealed to flange 68 is one end of an expansible and collapsible corrugated tubular wall or bellows 70 whose opposite end is hermetically sealed to an inwardly directed flange 71 on a cup-shaped member 72 which is interiorly threaded adjacent its open end as shown at 73. Hermetically sealed in said threaded end 73 is a block 74 having an internal chamber 75 leading to the chamber 76 in cup-shaped member 72 in which head or plunger 66 is disposed and which is completed by the bellows 70.

Interiorly thereof cup-shaped member 72 is provided with a shoulder 78 which is spaced from the inner face 79 of the block 74 by such a distance in excess of the thickness of the flange 67 as to predetermine, by the cooperation of said shoulder 78 and face 79 with the opposite sides of said flange 67, the maximum extent to which the head or plunger 66, and therefore the stem 40 and the valve members 38 and 39 attached thereto, may be moved as a result of variations in fluid pressure in the chamber 76 hereinafter referred to.

Mounted in the chamber 14 in any suitable way, as by securing its outer wall to an inner wall 81 in said housing section 11, is a cup-shaped wall 82 having an end wall 83 of good heat conducting material, wall 82 being formed in any suitable way, as by providing the same with a circular depression, to provide an inwardly directed stop 84. Secured in any suitable way at the open end of said cup-shaped wall 82 is a flanged ring 85 to which is hermetically sealed an expansible and collapsible corrugated tubular wall or bellows 86 the opposite end of which is hermetically sealed to the flanged peripheral extremity of a movable member or end wall 87 apertured at 88 to receive a block 89 that is secured therein and shown as provided with an interior filling passage 90. Block 89 at its free end is reduced in cross section at 91 and fits into a correspondingly shaped socket 92 in the end of the block 74. Mounted on the end of the retaining ring 63 in any suitable way is a tubular member 94 which projects to a position contiguous to the member 87 so as to provide a stop 95 for said member when said member moves away from the before described stop 84. Also, interposed between the end of retaining member 63 and member 87 is a coil spring 96 which urges member 87 toward stop 84.

The expansible and collapsible chamber 98 defined by cup-shaped member 82, ring 85, bellows 86 and member 87 is charged with any suitable thermostatic fluid, as through the passage 90, after which said passage may be sealed by a plug at 99. Coil spring 96 tends to hold member 87 against the stop 84 whenever a cooling medium is flowing through the chamber 14 because the fluid in said chamber 98 is then contracted or condensed, but when a heating medium is flowing through said chamber 14 the fluid in the chamber 98, by expansion or vaporization, causes said chamber 98 to expand against the tension of said spring 96 until member 87 engages stop 95. Thereby the valve mechanism is conditioned properly by the thermostat including chamber 98 to regulate the flow of either a cooling medium or a heating medium, depending on which is flowing through the chamber 14, as will hereinafter appear.

The before mentioned chamber 76 is in communication through chamber 75 and suitable passages 100 in block 74 with a conduit 101 which is preferably of flexible construction and coiled around the cup-shaped member 72 so as to provide a flexible portion that takes care of the axial movement of blocks 89 and 74 and cup-shaped member 72 as hereinafter referred to. Conduit 101 extends through a suitable opening 102 in the retaining ring 63 and a suitable opening 103 in the housing section 12, and is connected in any suitable way as by T coupling 104 to a conduit 105, which may be rigid or flexible and of any suitable length, leading to a temperature responsive member 106 of any suitable construction, here shown as a bulb of tubular formation and provided with fins 107 to facilitate response to the temperature of the ambient. Bulb 106, conduits 105 and 101, passages 100 and chambers 75 and 76, including the extension of the latter completed by bellows 70, are charged with any suitable thermostatic fluid so that variations in temperature at the bulb 106 cause variations in pressure in the chamber 76, and as the inner face of head 66 has an unbalanced area exposed to the pressure in chamber 76, such variations of pressure operate the valve unit comprising valve members 38 and 39 and valve stem 40 as to be explained.

The thermostat including bulb 106 is preferably made adjustable in any suitable way. As shown the conduit 105 is connected, as by the coupling 104, to a conduit 110 that in turn is connected in any suitable way to a passage 111 in a block 112. Block 112 has an interiorly threaded recess 113 communicating with said passage 111 and mounted in said recess is a tubular post 114 having an interior passage 115. Suitably attached to the free end of said post 114, as by threads, is an exteriorly flanged member 116 to which is hermetically sealed an expansible and collapsible corrugated tubular wall or bellows 117 that, at its opposite end, is hermetically sealed to a flanged ring 118 secured in any suitable way to an exterior tubular member 119. Member 119 at its opposite end is secured in any suitable way to a head 120. Slidably mounted on the exterior of said tubular member 119 is a cup-shaped member 121 between which and an exterior flange 122 on said member 119 extends a coil spring 123. To prevent spring 123 from forcing cup-shaped member 121 beyond block 120, cup-shaped member 121 is formed interiorly to provide a shoulder 124 and block 120 has any suitable stop means for cooperation therewith, here shown as a spring snap ring 125 held in a groove 126 at the periphery of said block 120. Also mounted on block 112 as by screws 128 is a tubular housing member 129, and cup-shaped member 121 has an exterior flange 130 of such size as to be guided by the interior wall of housing member 129. At its opposite end housing member 129 is secured in any suitable way as by screws 131 to a block 132 having an interiorly threaded aperture 133 in which is mounted an adjusting screw 134 having its inner extremity operatively engaged with the end wall 135 of cup-shaped member 121. Adjusting screw 134 is provided exteriorly of the block 132 with any suitable manual manipulating means as a hand knob 136 which may be provided with a pointer 138 for cooperation with any suitable indicia on the outer face of the block 132.

If a suitable source of cooling fluid is connected with the inlet 24, such fluid will flow into the chamber 14 through aperture 15 after passing through the filter 18, and even if the port 31 is closed circulation will be maintained through the by-pass in communication with the opening 26. Thereby a circulation will be maintained through the chamber 14 at all times. Under the assumption that it is a cooling fluid flowing through the chamber 14, the charge in chamber 98 is contracted or condensed, and movable member 87 is held by its spring 96 against its stop 84, as shown in Fig. 1.

Figure 3:
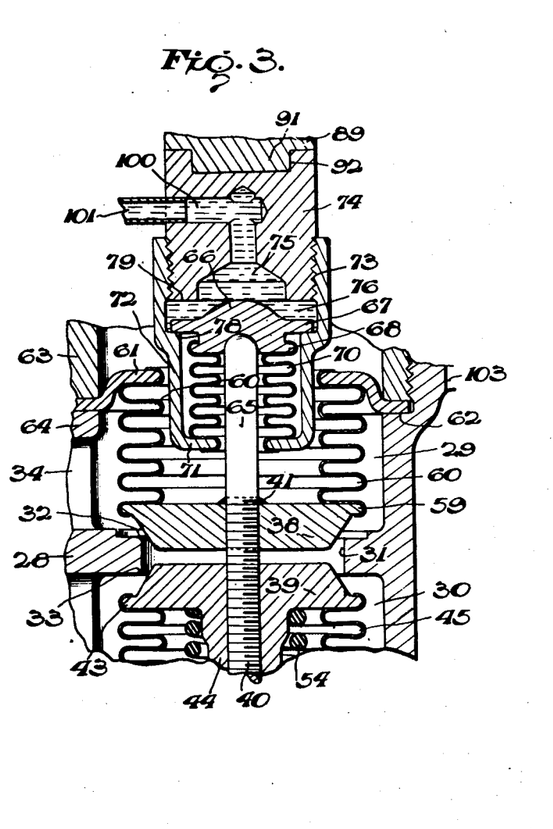
Fig. 3 is an enlarged partial cross section of Fig. 1 to illustrate the position of the valve members when the valve member for controlling the flow of a cooling medium is in wide open position.
Figure 4:
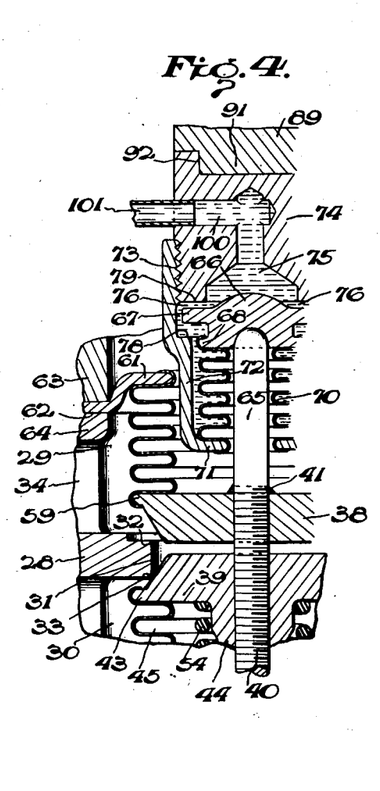
Fig. 4 is a view corresponding to Fig. 3 but illustrating the valve member for controlling the flow of cooling medium in closed position.

If the temperature to which the bulb 106 is subjected is such that no cooling fluid should flow to the heat exchangers, flow of said fluid is prevented because, as shown in Fig. 1, valve member 39 is in contact with seat 33, preventing flow of cooling fluid from chamber 29 into chamber 30. If, however, the temperature to which the bulb 106 is subjected should rise, requiring a flow of cooling medium, the charge in the thermostat which includes said bulb, the conduit 101 and the chambers 75 and 76 will expand, applying an unbalanced pressure on the head or plunger 66 and moving the valve unit downwardly as viewed in Fig. 1, so that valve member 39 moves away from its valve seat 33 proportionately to the extent of pressure applied to the head 66, said movement being against the tension of spring 54 which is adjustable by manipulation of knob 52. Increased temperature at the bulb 106 moves head 66 in the direction to move valve member 39 to a greater distance away from its port 33 until flange 67 engages the seat 78 when valve member 39 is in its wide open position as shown in Fig. 3. The original adjustment of the parts as heretofore referred to is such that flange 67 will engage seat 78 before valve member 38 starts to reduce the maximum opening through the port 31, whereby an increase in temperature cannot cause the valve unit to overrun and decrease the flow of cooling medium. Conversely, if the temperature to which the bulb 106 is subjected decreases the charge in the thermostat including the bulb 106 contracts, the pressure on head 66 is decreased, and valve member 39 is moved proportionately toward its seat under the action of the spring 54 as rapidly as permitted by the restraint imposed on the stem 40 by the head or plunger 66 until, as a limit, valve member 39 engages its seat 33 and closes the opening through the port 31 as shown in Fig. 4. It will be observed that the operation of the valve unit as so conditioned is appropriate for controlling the flow of a cooling medium because increase of temperature produces an increased flow of said medium.

Figure 2:
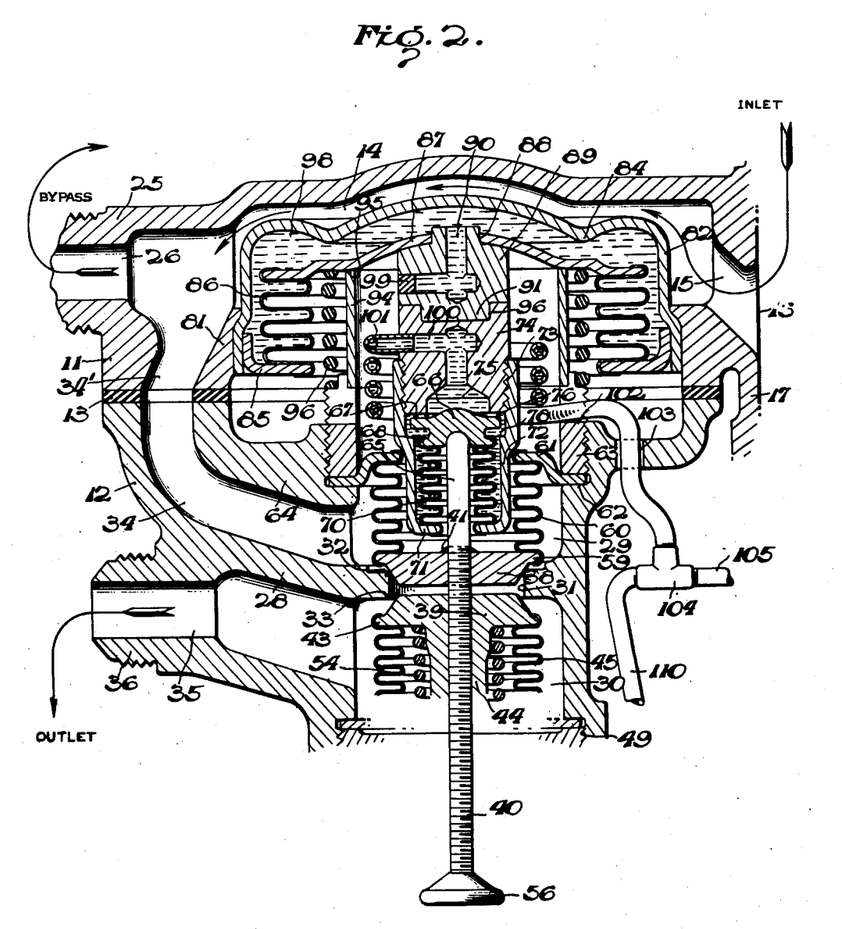
Fig. 2 is a partial view corresponding to Fig. 1 but illustrating the parts conditioned for controlling the flow of a heating medium.

If, as in cold weather, a suitable source of heating medium is now connected to the regulator, the heating medium flows through the chamber 14 and, even if the port 31 is closed, the flow through the by-pass assures that the thermostat including chamber 98 is promptly subjected to the higher temperature of the heating medium which causes the thermostatic charge in said chamber 98 to expand, moving the member 87, against the tension of spring 96, to the stop 95 as shown in Fig. 2. As block 89 is secured to member 87 it moves therewith, and owing to the interconnection between block 87 and block 74 heretofore referred to, block 74 is moved therewith. As cup-shaped member 72 is hermetically sealed to block 74, it moves therewith, and therefore the members attached thereto and including the head or plunger 66, stem 40 and valve members 38 and 39 carried by the latter are all moved downwardly as viewed in Fig. 1 to the relationship shown in Fig. 2. The valve mechanism is now conditioned properly for controlling the flow of a heating medium as will now appear.

Figure 5:
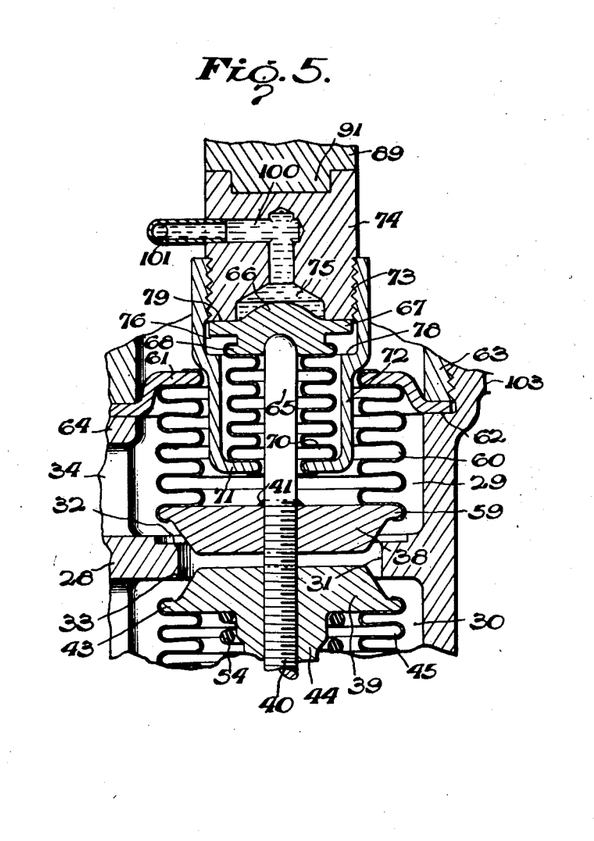
Fig. 5 is a view corresponding to Fig. 3 to illustrate the position of the valve members when the valve member for controlling the flow of a heating medium is in wide open position.
Figure 6:
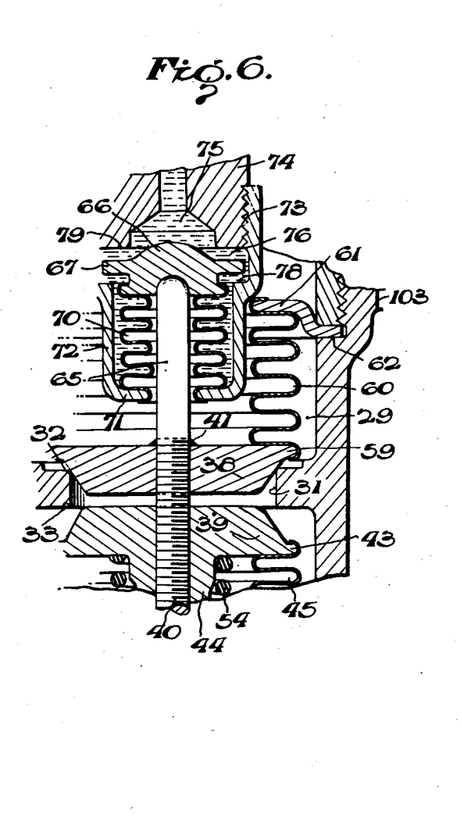
Fig. 6 is a view corresponding to Fig. 5 but illustrating the valve member for controlling the flow of heating medium in closed position.

If the temperature to which the bulb 106 is subjected is such that no heating medium should flow to the heat exchangers, valve member 38 is in contact with its seat 32 and flow of the heating medium through the port 31 is prevented, as shown in Fig. 2. If the temperature to which the bulb 106 is subjected decreases so as to require a flow of heating medium the charge in the thermostat including the bulb 106 contracts and decreases the pressure on the head or plunger 66, whereby the spring 54 moves the unit comprising valve members 38 and 39 and stem 40 in the upward direction as viewed in Fig. 2, moving the valve member 38 away from its seat 32 to initiate the flow of the heating medium through port 31 and out through outlet 35. Continued contraction of the charge in said thermostat results in continued movement of said valve unit until the port 31 is wide open. In this position of the parts the flange 67 is seated at 79 against the block 74 as shown in Fig. 5 so that the valve member 39 cannot be moved to a position such that it begins to decrease the flow of heating medium through port 31. As the temperature to which the bulb 106 is subjected increases the charge in the thermostat including said bulb expands, applying a pressure to the head or plunger 66 and moving the same downwardly as viewed in Fig. 2, thereby decreasing the flow of heating medium until eventually valve member 38 is engaged with its seat 32 as shown in Fig. 6. This regulation is proper for the control of a heating medium.

As the thermostat including the bulb 106 and the conduit 101 is in open communication, through the conduit 110 and passage 115, with the expansible and collapsible chamber 140 defined by bellows 117, tubular wall 119 and head 120, it is apparent that the pressure applied to head or plunger 66 may be increased or decreased, to adjust the valve unit with respect to its seats and thereby advance or retard engagement therebetween, as the case may be, by increasing or decreasing the pressure on the fluid in chamber 140. This is effected by rotating the hand knob 136 and threaded stem 134 to expand or contract chamber 140 by applying pressure to or releasing pressure from the movable end of bellows 117, cup-shaped wall 121, spring 123 and tubular member 119 moving as a unit during such adjustments.

If the pressure in the thermostat including bulb 106 should continue to increase after the valve unit comprising valve members 38 and 39 and stem 40 has been moved to an extreme position so that further movement is prevented by engagement of a valve member with its seat, injury to the parts will be prevented because such increase in pressure applied to chamber 140 will move head 120 upwardly as viewed in Fig. 1, compressing spring 123 and causing tubular member 119 to slide into cup-shaped member 121 until, by reduction of the pressure in chamber 140, the parts are restored to original position by the tension of spring 123.

As thermostat 98 expands against the tension of spring 54 as well as spring 96, the temperature at which thermostat 98 expands may be nicely predetermined by adjusting the tension of spring 54 by manipulating tubular nut 51 from knob 52. By making only the smaller load of spring 54 adjustable and applying the larger load of spring 96 directly to the thermostat 98, the larger load is not transmitted to bellows 70 while a moderate load is applied to the head or plunger 66 to maintain the thermostatic system including chamber 76 under a moderate pressure. Less effort is also required to move the valve members 38 and 39 manually as next to be referred to.

If at any time because of local conditions, as when a by-pass is not used or becomes inoperative, the regulator becomes temporarily unresponsive to a change in the temperature conditions the valve unit may be moved manually by knob 56 to move the valve members 38, 39 and open the port 31 and thereby establish flow through the regulator until the thermostat 98 can take control because of contact of the flowing medium therewith.

It will therefore be perceived that by the present invention a simple, compact and highly efficient regulator has been provided which is sensitively responsive to temperature variations. As the device employs only a single port with a valve unit comprising two valve members and a valve stem associated therewith, the construction is particularly simple and compact. At the same time, by reason of the provision associated with said valve unit for limiting the maximum movement of said unit with respect to said port in each direction, assurance is had that the valve unit can never move past that position in either direction wherein the port is wide open and a maximum flow of heating medium or cooling medium is maintained. Hence danger of the flow of medium being decreased by excessive movement of the valve unit when maximum flow is called for is entirely avoided. The by-pass assures that even though the valve port be closed the thermostat including the chamber 98 will promptly respond to a change in the medium introduced through the inlet 24. Adjustment of the temperature to be maintained is readily effected by manipulation of the knob 136, while the associated mechanism assures that increase in internal pressure after movement of the valve unit into engagement with a seat will not result in injury to the parts. The regulator is composed of a relatively few, easily-fabricated parts that are easy to assemble, and therefore the regulator may be manufactured economically.

While the embodiment of the invention illustrated on the drawing has been described with considerable particularity it is to be expressly understood that the invention is not limited thereto, as the same is capable of receiving a variety of mechanical expressions, as will now be apparent to those skilled in the art, while changes may be made in the details of construction, arrangement, proportion, size, etc., component parts may be replaced by equivalent parts, certain features may be omitted, etc., all without departing from the spirit of this invention. Reference is therefore to be had to the claims hereto appended for a definition of said invention.

What is claimed is:

1. In a temperature regulator for automatically controlling the flow of either a heating medium or a cooling medium, in combination with a housing having an inlet and an outlet, means in said housing providing a single port through which all medium flowing to said outlet must pass and having valve seats at its opposite extremities, a valve unit comprising a pair of opposed valve members for cooperation with said valve seats, a thermostat in said housing subjected to the temperature of the medium admitted to said housing through said inlet and having a movable wall, an operative connection between said movable wall and said valve unit including a hollow container operatively connected to said movable wall, a movable member interiorly of said container, an expansible and collapsible wall sealed to said container and said movable member and forming therewith an expansible and collapsible chamber, and connecting means between said movable member and said valve unit, means cooperating with said expansible and collapsible chamber to form a second thermostat for response to variations in the temperature to be maintained, and means in said last named chamber cooperating with said movable member to limit the range of movement of said valve unit.

2. In a temperature regulator for automatically controlling the flow of either a heating medium or a cooling medium, in combination with a housing having an inlet and an outlet, ported means in said housing providing valve seats, a valve unit for cooperation with said seats, a movable member operatively connected to said valve unit, means associated with said member for forming a chamber in which pressure may be applied to said member and having a flexible connection with said member, a thermostat in said housing subjected to the temperature of the medium admitted to said housing through said inlet and having a movable end wall operatively connected to said chamber-forming means, and a container having means of communication with said chamber and forming therewith a second thermostat charged with a thermosensitive fluid for varying the pressure on said movable member in conformity with changes in the temperature to be controlled.

3. In a temperature regulator for automatically controlling the flow of either a heating medium or a cooling medium, in combination with a housing having an inlet and an outlet, ported means in said housing providing valve seats, a valve unit for cooperation with said seats, said valve members having equal effective areas to balance said valve unit against variations in pressure of the medium under control, a movable member operatively connected to said valve unit, means associated with said member for forming a chamber in which pressure may be applied to said member and having a flexible connection with said member, a thermostat in said housing subjected to the temperature of the medium admitted to said housing through said inlet and having a movable end wall operatively connected to said chamber-forming means, and a container having means of communication with said chamber and forming therewith a second thermostat charged with a thermosensitive fluid to vary the pressure on said movable member in conformity with changes in the temperature to be controlled.

4. In a temperature regulator for automatically controlling the flow of either a heating medium or a cooling medium, in combination with a housing having an inlet and an outlet, ported means in said housing providing valve seats, a valve unit for cooperation with said seats, a plunger operatively connected to said valve unit, means associated with said plunger for forming a chamber in which pressure may be applied to said plunger and having a flexible connection with said plunger, a thermostat in said housing subjected to the temperature of the medium admitted to said housing through said inlet and having a movable end wall operatively connected to said chamber-forming means, a container having means of communication with said chamber and forming therewith a second thermostat charged with a thermosensitive fluid to vary the pressure on said plunger in conformity with changes in the temperature to be controlled, and means in said chamber providing stops at opposite sides of said plunger to limit in both directions the extent to which said plunger may be moved by variations in the pressure in said second named thermostat.

5. In a temperature regulator for automatically controlling the flow of either a heating medium or a cooling medium, in combination with a housing having an inlet and an outlet, ported means in said housing providing valve seats, a valve unit for cooperation with said seats, a movable member operatively connected to said valve unit, means associated with said member for forming a chamber in which pressure may be applied to said member and having a flexible connection with said member, a thermostat in said housing subjected to the temperature of the medium admitted to said housing through said inlet and having a movable end wall operatively connected to said chamber-forming means, a container having means of communication with said chamber and forming therewith a second thermostat charged with a thermosensitive fluid to vary the pressure on said movable member in conformity with changes in the temperature to be controlled, an expansible and collapsible chamber in communication with said second named thermostat, and means for expanding and contracting said last named chamber to vary the pressure of the fluid on said movable member.

6. In a temperature regulator for automatically controlling the flow of either a heating medium or a cooling medium, in combination with a housing having an inlet and an outlet, ported means in said housing providing valve seats, a valve unit for cooperation with said seats, a plunger operatively connected to said valve unit, means associated with said plunger for forming a chamber in which pressure may be applied to said plunger and having a flexible connection with said plunger, a thermostat in said housing subjected to the temperature of the medium admitted to said housing through said inlet and having a movable end wall operatively connected to said chamber-forming means, a container having means of communication with said chamber and forming therewith a second thermostat charged with a thermosensitive fluid to vary the pressure on said plunger in conformity with changes in the temperature to be controlled, means in said chamber providing stops at opposite sides of said plunger to limit in both directions the extent to which said plunger may be moved by variations in the pressure in said second named thermostat, an expansible and collapsible chamber in communication with said second named thermostat, and means for expanding and contracting said last named chamber to vary the pressure of the fluid on said plunger.

7. In a temperature regulator for automatically controlling the flow of either a heating medium or a cooling medium, in combination with a housing having an inlet and an outlet, ported means in said housing providing valve seats, a valve unit for cooperation with said seats, a movable member operatively connected to said valve unit, means associated with said member for forming a chamber in which pressure may be applied to said member and having a flexible connection with said member, a thermostat in said housing subjected to the temperature of the medium admitted to said housing through said inlet and having a movable end wall operatively connected to said chamber-forming means, a container having means of communication with said chamber and forming therewith a second thermostat charged with a thermosensitive fluid to vary the pressure on said movable member in conformity with changes in the temperature to be controlled, and a by-pass communicating with said housing for maintaining a continuous circulation of the medium to be controlled over said first named thermostat.

8. In a temperature regulator for automatically controlling the flow of either a heating medium or a cooling medium, in combination with a housing having an inlet and an outlet, ported means in said housing providing valve seats, a valve unit for cooperation with said seats, a movable member operatively connected to said valve unit, means associated with said member for forming a chamber in which pressure may be applied to said member and having a flexible connection with said member, a thermostat in said housing subjected to the temperature of the medium admitted to said housing through said inlet and having a movable end wall operatively connected to said chamber-forming means, a container having means of communication with said chamber and forming therewith a second thermostat charged with a thermosensitive fluid to vary the pressure on said movable member in conformity with changes in the temperature to be controlled, and manually operable means connected to said valve unit for positioning the same independently of thermostatic control.

9. In a temperature regulator for automatically controlling the flow of either a heating medium or a cooling medium, the combination of a housing having an inlet and an outlet, ported means in said housing providing valve seats, a valve unit for cooperation with said valve seats, a thermostat in said housing subjected to the temperature of the medium admitted to said housing through said inlet, said thermostat having a movable end wall, chamber-forming means connected with said movable wall to move therewith, a movable member in said chamber operatively connected to said chamber-forming means and to said valve unit, and a container for thermosensitive fluid in communication with said chamber and subjected to the temperature to be controlled, said chamber and container forming a second thermostat for varying the pressure on said movable member.

10. In a temperature regulator for automatically controlling the flow of either a heating medium or a cooling medium, the combination of a housing having an inlet and an outlet, ported means in said housing providing valve seats, a valve unit for cooperation with said valve seats, a thermostat in said housing subjected to the temperature of the medium admitted to said housing through said inlet, said thermostat having a movable end wall, chamber-forming means connected with said movable wall to move therewith, a plunger in said chamber operatively connected to said chamber-forming means and to said valve unit, a container for thermosensitive fluid in communication with said chamber and subjected to the temperature to be controlled, said chamber and container forming a second thermostat for varying the pressure on said plunger, and means in said chamber cooperating with said plunger for predetermining the extent of movement of said valve unit.

11. In a temperature regulator for automatically controlling the flow of either a heating medium or a cooling medium, the combination of a housing having an inlet and an outlet, ported means in said housing providing valve seats, a valve unit for cooperation with said valve seats, a thermostat in said housing subjected to the temperature of the medium admitted to said housing through said inlet, said thermostat having a movable end wall, chamber-forming means connected with said movable wall to move therewith, a movable member in said chamber operatively connected to said chamber-forming means and to said valve unit, a container for thermosensitive fluid in communication with said chamber and subjected to the temperature to be controlled, said chamber and container forming a second thermostat for varying the pressure on said movable member, and manually operable means in communication with said chamber for varying the fluid pressure therein.

12. In a temperature regulator for automatically controlling the flow of either a heating medium or a cooling medium, the combination of a housing having an inlet and an outlet, means in said housing providing a port through which all medium flowing to said outlet must pass and having valve seats at its opposite extremities, a valve unit comprising a pair of opposed valve members for cooperation with said valve seats, a thermostat in said housing subjected to the temperature of the medium admitted to said housing through said inlet, said thermostat having a movable end wall, chamber-forming means connected with said movable wall to move therewith, a plunger in said chamber, a bellows connecting said plunger to said chamber-forming means, means operatively connecting said plunger to said valve unit, and a container for thermosensitive fluid in communication with said chamber and subjected to the temperature to be controlled said chamber and container forming a second thermostat for varying the pressure on said plunger.

WILLIAM W. CARSON, Jr.

REFERENCES CITED

The following references are of record in the file of this patent:

UNITED STATES PATENTS

| Number | Name | Date |
| --- | --- | --- |
| 2,086,037 | Kronmiller | July 6, 1937 |
| 2,353,889 | Giesler | July 18, 1944 |